Figure 1:
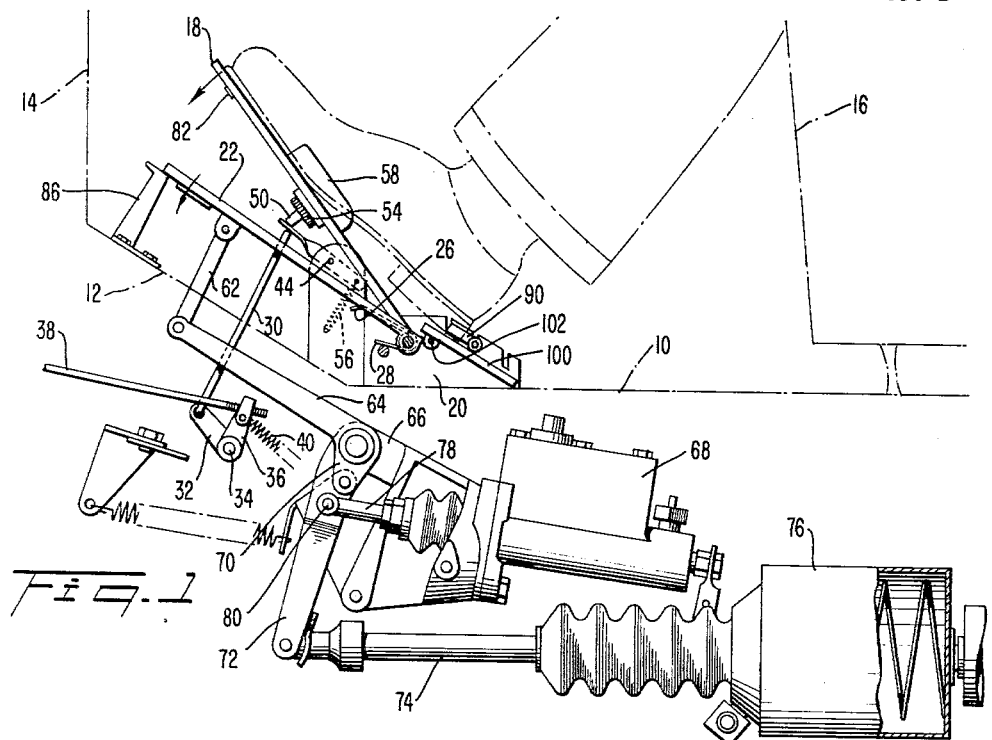

Feb. 1, 1966 H. F. GROTE 3,232,398
COMBINED THROTTLE AND BRAKE CONTROL MECHANISM
Filed Nov. 29, 1962 2 Sheets-Sheet 1

INVENTOR.
HERBERT F. GROTE
BY
ATTORNEY

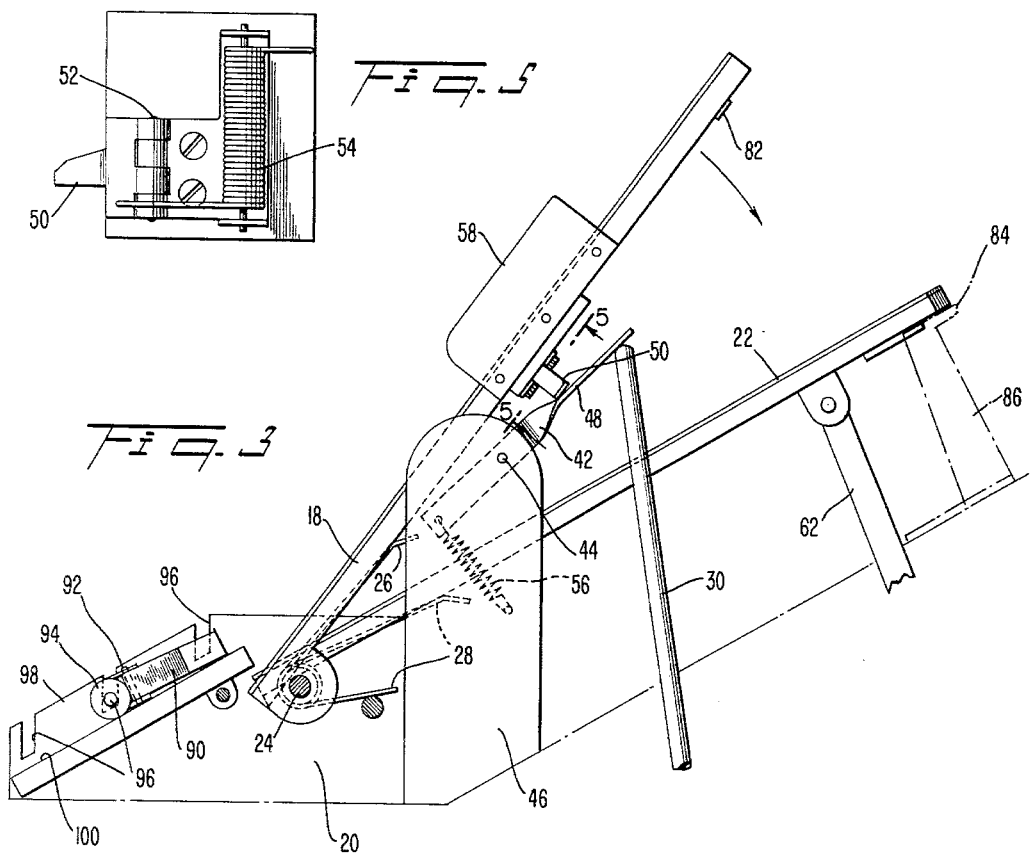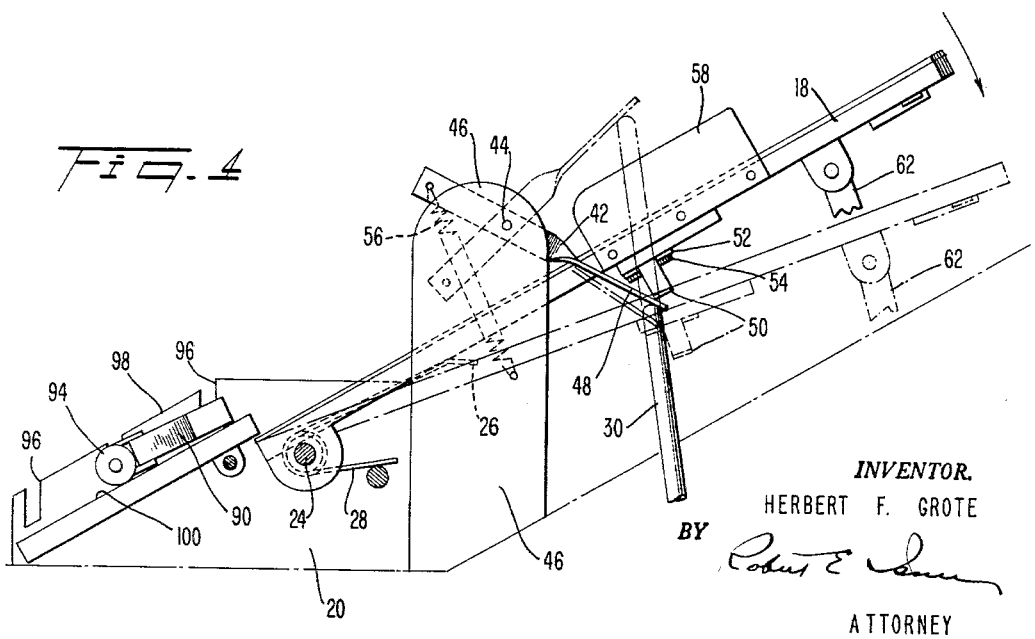

United States Patent Office 3,232,398
Patented Feb. 1, 1966

3,232,398
COMBINED THROTTLE AND BRAKE
CONTROL MECHANISM
Herbert F. Grote, 19 Weston Mill Road,
East Brunswick, N.J.
Filed Nov. 29, 1962, Ser. No. 240,963
13 Claims. (Cl. 192—3)

This invention relates to control mechanisms for automotive vehicles and particularly to a combined control for the throttle and brake parts of such vehicles.

Under certain conditions operators of automobiles involuntarily either from inexperience or some mental or physical temporary handicap lose control of the car by pressing the throttle pedal when they should be applying the brake. This particularly applies to beginners who in a panic will open the throttle instead of closing it with the obvious disastrous result.

It is an object of this invention to provide a combined throttle and brake control mechanism which will produce the result of disconnecting the throttle and applying the brake to stop the car. Though it is understood of course that while sudden application of the brake is not most desirable under such conditions it is much preferable to application of full power at the throttle. As such a mechanism this control constitutes a safety device for emergency application preferably.

Figure 2:
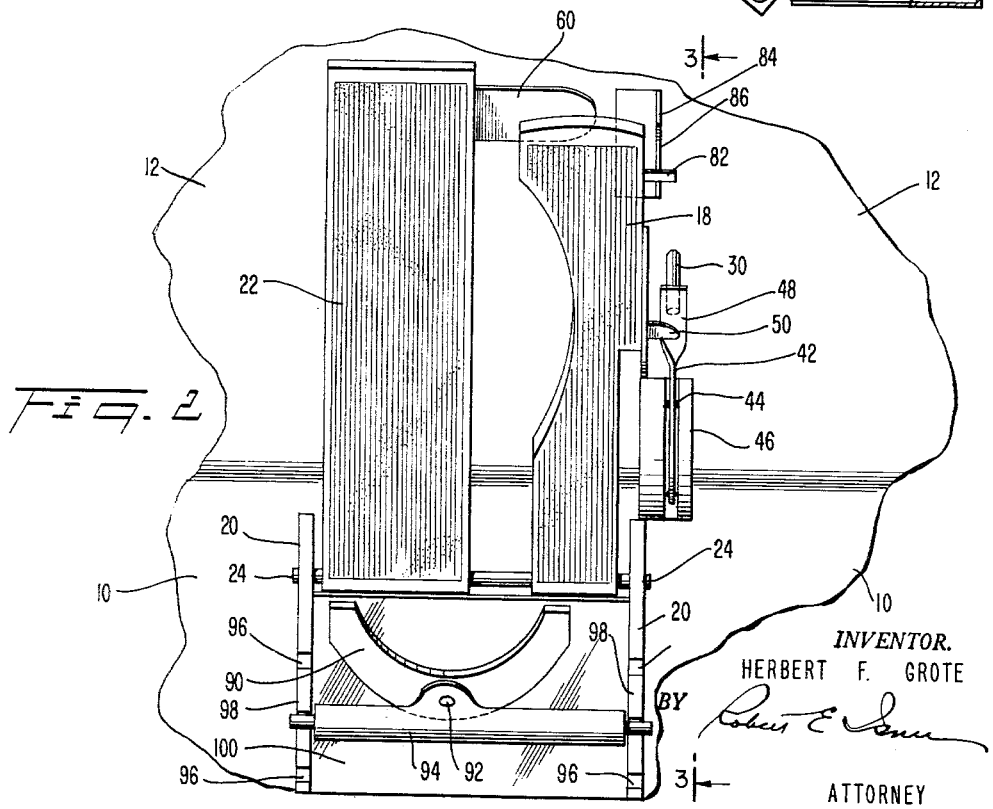

The invention in a preferred form is illustrated in the drawings in which:

FIGURE 1 is a side view of the control mechanism, its mounting being indicated diagrammatically, FIG. 2 is a plan view of the pedal mechanism and controls, FIG. 3 is a side view showing the throttle pedal in raised position, FIG. 4 is a side view showing the throttle pedal in a partly depressed position and the throttle operating link and its means of release, and FIG. 5 is a bottom detail view of the latch for engaging the throttle operating lever.

Referring to the drawings the invention is shown as it would be mounted on a floor 10 indicated diagrammatically, a foot board 12 and fire wall 14 of the usual automobile. The operator would normally be seated on the driver's seat indicated at 16 and his foot would rest upon a throttle pedal 18 pivotally mounted on a bracket 20 supported on the floor 10. Beside throttle pedal 18 is likewise mounted a brake pedal 22 there being a pivot shaft 24 at the heel end of both pedals and supported by bracket 20. Suitable springs 26 and 28 are provided to maintain pedals 18 and 22 in their raised unoperated positions.

Throttle pedal 18 is adapted to depress a throttle link 30 which is suitably connected by a lever 32 on a cross shaft 34 and lever 36 to a rod 38 connected to the usual carburetor throttle valve (not shown). For retracting rod 38 a coil spring 40 is provided. Means is provided to transfer motion of the throttle pedal 18 to throttle link 30 which includes a member, in this instance, a lever 42 pivotally supported on a pin 44 carried by an upright bracket 46 and having a twisted end 48 to present a flat surface to the end of link 30. On the lower side of the pedal 18 and extending laterally therefrom is provided a latch member 50. Hinged longitudinally on a pin 52 and biased in its upper position by a spring 54 and being on the under side of pedal 18, latch member 50 is forced by the under surface of pedal 18 to engage lever 42 as that pedal is depressed. However, as shown in FIG. 4 when pedal 18 is depressed to a predetermined position as shown in dotted lines the arm 50 of the latch passes over the end of lever 42 releasing that lever which by the biasing effect of spring 56 permits link 30 to rise and to retract rod 38 to close the throttle valve of the engine. Upon release of pedal 18 arm 50 by its latch-like action will rotate about its pivot 52 to pass by the flattened end 48 and to reengage as shown in FIG. 3 for subsequent operation of throttle link 30. The operator's foot is prevented from interfering with this operation as described by means of a plate 58 mounted at the side of throttle pedal 18.

At the predetermined point of depression of throttle pedal 18 the end of that pedal is adapted to engage brake pedal 22 by means of a laterally extending arm 60 mounted preferably on the underside of pedal 22 so that the car brakes will be applied as an emergency proposition. Preferably very little throw in pedal 22 would be desired and for this purpose it would seem best to employ the power type of brake which is roughly illustrated in FIG. 1 in which a link 62 pivotally connects pedal 22 with a bell crank 64 mounted on a stationary bracket 66 supporting the pilot valve 68 of a power brake system. In this instance the short arm 70 of bell crank 64 is hinged to a lever 72 which at its remote end is attached to the plunger 74 of vacuum cylinder 76. At an intermediate point pilot valve plunger 78 is attached by a pivot 80 to arm 72. This arrangement of pilot valve, vacuum cylinder and their levers and plungers form a follow-up system which, as is well known, requires very little power at the brake pedal 22 to apply great force to the brakes. Thus, as pedal 22 is slightly depressed arm 72 at its outer end acting as a pivot pushes plunger 78 in to cause valve 68 to apply vacuum within chamber 76 to pull plunger 74 outwardly and thus as pin 80 accordingly moves outwardly valve 68 is restored to its original position. Brake pressure is applied by plunger 74 and so long as brake pedal 22 remains in the slightly depressed position the brake pressure remains constant. Further depression though very slight on brake pedal 22 causes additional brake pressure to be applied as described.

As may be well understood such a power brake system is ideal for this combination control although it is conceivable that other systems might be quite well adapted also. It is understood that from the above description this combined throttle and brake control comes into action by depression of the throttle pedal 18 to its predetermined position at which engagement with arm 60 is about to take place.

It is understood, of course, that this apparatus can be used under conditions when it is not necessary as an emergency for the brakes to be applied as for instance when going up a steep hill. One may well wish to open the throttle wide without occurrence of this emergency stopping as above described and for this purpose there is provided a means to indicate that the throttle is wide open at a point slightly prior to the predetermined depressed position. For this purpose means is provided to apply an additional resistance to depression of throttle pedal 18 and for this purpose a spring member 82 is mounted on the lower face of throttle pedal 18 to engage a tongue 84 mounted in its path on a bracket 86 stationary on the floor board 12. Tongue member 82 is just stiff enough to provide the resistance which the average operator would recognize as he presses on the throttle pedal. To the usual operator this would be sufficient warning that he is approaching the limit at which a safety control comes into play and it is to be expected that he would act accordingly. Furthermore, the sudden release of the member 82 from tongue 84 would provide the additional force to operate the safety control as above described.

It is thought that the operator's foot would best be set in a fixed position so far as the heel is concerned and for this purpose a suitable curved member 90 to receive the operator's boot heel is mounted pivotally on a pin 92 carried by a transverse rod 94 fitting at its ends in suitable notches 96. Notches 96 are in pairs and spaced on side plates 98 carried by a bottom plate 100 which carries a rod 102 mountable in bracket 20. Fitting the cross rod 94 into the suitable notches 96 will permit comfortable positioning for a man's outsize foot or a lady's smaller one.

Thus, by the above construction are accomplished, among others, the objects hereinbefore referred to.

What I claim is:

1. A combined throttle and brake control mechanism for automotive vehicles comprising a throttle operating link, a throttle pedal, a brake pedal, resilient means to bias said pedals to raised unoperated positions, means to transfer motion of said throttle pedal to said throttle link to move said link progressively from idle throttle position corresponding to said raised throttle pedal position to full throttle position corresponding to lowered position of said throttle pedal, said means including a pivotally mounted member engageable by said throttle pedal and displaceable in accord therewith through a predetermined degree of depression of said throttle pedal and selectively disengageable therefrom in response to depression of said throttle pedal beyond said predetermined degree thereof, and means mounted on said throttle pedal to interengage said brake pedal upon depression of said throttle pedal past said predetermined degree thereof.

2. A combined throttle and brake control mechanism for automotive vehicles comprising a throttle operating link, a throttle pedal, a brake pedal, resilient means to bias said pedals to raised unoperated positions, and means to transfer motion of said throttle pedal to said throttle link including a pivotally mounted member engageable by said throttle pedal and displaceable in accord therewith through a predetermined degree of depression of said throttle pedal and selectively disengageable therefrom in response to depression of said throttle pedal beyond said predetermined degree thereof, means mounted on said throttle pedal to interengage said brake pedal upon depression of said throttle pedal past said predetermined degree thereof, and means to provide additional resistance to depression of said throttle pedal prior to said predetermined degree thereof.

3. A combined throttle and brake control mechanism for automotive vehicles comprising a throttle operating link, a throttle pedal, a brake pedal, resilient means to bias said pedals to raised unoperated positions, means to transfer motion of said throttle pedal to said throttle link including a pivotally mounted member engageable by said throttle pedal and displaceable in accord therewith through a predetermined degree of depression of said throttle pedal and selectively disengageable therefrom in response to depression of said throttle pedal beyond said predetermined degree thereof, means mounted on said throttle pedal to interengage the said brake pedal upon depression of said throttle pedal past said predetermined degree thereof, and means to provide additional resistance to depression of said throttle pedal prior to its reaching said predetermined degree thereof and disengagement of said throttle pedal from said pivotally mounted member.

4. A combined throttle and brake control mechanism for automotive vehicles comprising a throttle operating link, a throttle pedal, a brake pedal, resilient means to bias said pedals to raised unoperated positions, means to transfer motion of said throttle pedal to said throttle link including a pivotally mounted member engageable by said throttle pedal and displaceable in accord therewith through a predetermined degree of depression of said throttle pedal and selectively disengageable therefrom in response to depression of said throttle pedal beyond said predetermined degree thereof, means to provide additional resistance to depression of said throttle pedal prior to its reaching said predetermined degree thereof, and means to operatively re-engage said pivotally mounted member with said throttle pedal upon return thereof to its raised unoperated position.

5. A combined throttle and brake control for automotive vehicles comprising a pivoted throttle pedal, a pivoted brake pedal, spring means to bias both of said pedals to an unoperated raised position, said throttle pedal being engageable with said brake pedal at a predetermined depressed position, a throttle link engageable by said throttle pedal, and a latch to release said link from said throttle pedal at said predetermined depressed position.

6. A combined throttle and brake control for automotive vehicles comprising a pivoted throttle pedal, a pivoted brake pedal, spring means to bias both of said pedals to an unoperated raised position, said throttle pedal being engageable with said brake pedal at a predetermined depressed position, a throttle link engageable by said throttle pedal, a latch to release said link from said throttle pedal at said predetermined depressed position, and means to cause said latch to reengage said link with said throttle pedal upon raising thereof.

7. A combined throttle and brake control for automotive vehicles comprising a pivoted throttle pedal, a pivoted brake pedal, spring means to bias both of said pedals to an unoperated raised position, said throttle pedal being engageable with said brake pedal at a predetermined depressed position, a throttle link engageable by said throttle pedal, a latch to release said link from said throttle pedal at predetermined depressed position and additional yieldable means to oppose depression of said throttle pedal as it approaches said predetermined position.

8. A combined throttle and brake control for automotive vehicles comprising a pivoted throttle pedal, a pivoted brake pedal, spring means to bias both of said pedals to an unoperated raised position, said throttle pedal and brake pedal having overlapping portions in the path of movement of said throttle pedal for interengagement and depression of said brake pedal at a predetermined depressed position of said throttle pedal, a throttle link engageable by said throttle pedal, a latch to release said link from said throttle pedal at a predetermined depressed position, and means to cause said latch to reengage said link with said throttle pedal upon raising thereof.

9. A combined throttle and brake control for automotive vehicles comprising a pivoted throttle pedal, a pivoted brake pedal, spring means to bias both of said pedals to a raised unoperated position, an arm on said brake pedal to be engaged by said throttle pedal at a predetermined depressed position of said throttle pedal, a throttle link, a spring biased lever engaging said throttle link to impart motion thereto, a member on said throttle pedal engageable with said lever and automatically releasable therefrom at said predetermined position, and spring means to reengage said member and said lever upon return of said throttle pedal to its unoperated position.

10. A combined throttle and brake control for automotive vehicles comprising a pivoted throttle pedal, a pivoted brake pedal, spring means to bias both of said pedals to a raised unoperated position, means interconnecting said throttle pedal and said brake pedal at a predetermined depressed position of said throttle pedal to operate said brake pedal, a throttle link, a spring biased lever engaging said throttle link to impart motion thereto, a member on said throttle pedal engageable with said lever and automatically releasable therefrom at said predetermined position, spring means to reengage said member and said lever upon return of said throttle pedal to its unoperated position, and a spring member to provide additional opposition to depression of said throttle pedal at said predetermined position.

11. A combined throttle and brake control for automotive vehicles comprising a pivoted throttle pedal, a pivoted brake pedal, spring means to bias both of said pedals to a raised unoperated position, means interconnecting said throttle pedal and brake pedal at a predetermined depressed position of said throttle pedal to operate said brake pedal, a throttle link, a spring biased lever engaging said throttle link to impart motion thereto, a member on said throttle pedal engageable with said lever and automatically releasable therefrom at said predetermined position, spring means to reengage said member and said lever upon return of said throttle pedal to its unoperated position, a spring member to provide additional opposition to depression of said throttle pedal at said predetermined position, and an adjustable abutment adjacent said pedals to receive the operator's heel.

12. A combination throttle and brake control for automotive vehicles comprising a pivoted fuel throttle pedal for controlling the rate of vehicle advance in response to the degree of depression thereof, a pivoted brake pedal for retarding vehicle advance in response with the degree of depression thereof, said throttle pedal being positioned adjacent said brake pedal, said throttle pedal being positioned to have an arcuate range of movement between idle and full throttle which latter is vertically displaced upward from the upper surface of said brake pedal such that the driver's foot may be slid sideways and downward into contact with said brake pedal to reduce the time required to effect braking.

13. A combination throttle and brake control as set forth in claim 12 and in which the side of the throttle pedal adjacent said brake pedal is recessed to facilitate a sideways and downward movement of the operator's foot from said throttle pedal to said brake pedal.

References Cited by the Examiner

UNITED STATES PATENTS

| | | | |
|---|---|---|---|
| 1,664,479 | 4/1928 | MacKean | 192—3 |
| 2,100,225 | 11/1937 | Stein | 192—1 |
| 2,164,921 | 7/1939 | Hoff | 192—3 |

FOREIGN PATENTS

| | | |
|---|---|---|
| 131,168 | 1/1933 | Austria. |

DAVID J. WILLIAMOWSKY, *Primary Examiner.*